United States Patent [19]

Charng

[11] Patent Number: 5,065,474
[45] Date of Patent: Nov. 19, 1991

[54] MULTIPLE POSITION ADAPTER FOR MOUNTING WIPER-BLADE ASSEMBLY ON WIPER ARM

[75] Inventor: Cedric S. K. Charng, Taipei, Taiwan

[73] Assignee: China Wiper Special Rubber Co., Ltd., Taiwan

[21] Appl. No.: 543,134

[22] Filed: Jun. 22, 1990

[51] Int. Cl.⁵ .............................................. B60S 1/40
[52] U.S. Cl. ............................ 15/250.32; 15/250.31; 403/154; 403/161
[58] Field of Search ........... 15/250.32, 250.31, 250.33, 15/250.35, 250.36, 250.42; 403/154, 155, 152, 161

[56] References Cited

U.S. PATENT DOCUMENTS

| | | | |
|---|---|---|---|
| 1,445,473 | 2/1923 | Beagle | 15/250.32 |
| 1,703,181 | 2/1929 | Tarver | 15/250.33 |
| 3,757,377 | 9/1973 | Hayhurst | 15/250.32 |
| 3,864,783 | 2/1975 | Arman | 15/250.32 |
| 3,896,519 | 7/1975 | Pankow | 15/250.32 |
| 3,922,749 | 12/1975 | Castleman, Jr. et al. | 15/250.32 |
| 4,114,227 | 9/1978 | Blackman | 15/250.32 |
| 4,118,825 | 10/1978 | Hoebrechts et al. | 15/250.32 |
| 4,120,069 | 10/1978 | Sharp et al. | 15/250.32 |
| 4,343,062 | 8/1982 | van den Berg | 15/250.32 |
| 4,649,591 | 3/1987 | Guerard | 15/250.32 |

FOREIGN PATENT DOCUMENTS

| | | | |
|---|---|---|---|
| 105750 | 11/1938 | Australia | 15/250.32 |
| 2220941 | 11/1973 | Fed. Rep. of Germany | 15/250.32 |
| 2404474 | 8/1975 | Fed. Rep. of Germany | 15/250.32 |

Primary Examiner—Harvey C. Hornsby
Assistant Examiner—Gary K. Graham
Attorney, Agent, or Firm—Herbert Dubno; Andrew Wilford

[57] ABSTRACT

An adapter for mounting a blade assembly on a wiper arm comprises an adapter body formed with a transverse adapter-body hole through which the pin is engageable, a latch for releasably retaining the pin in the hole, and a mount securing the body on the assembly over the blade hole thereof. The body is of U-section and embraces the blade assembly at the blade hole. In addition the body has a pair of side walls that form the mount and that flank the blade assembly at the blade hole. These side walls are formed with aligned holes and the blade assembly has at the blade hole lateral projections engageable in aligned holes. The projections in turn are annular collars coaxial with the blade hole.

4 Claims, 1 Drawing Sheet

MULTIPLE POSITION ADAPTER FOR MOUNTING WIPER-BLADE ASSEMBLY ON WIPER ARM

FIELD OF THE INVENTION

The present invention relates to the mounting of a wiper blade assembly on a wiper arm. More particularly this invention concerns an adapter for mounting such a blade assembly on such an arm.

BACKGROUND OF THE INVENTION

A wiper arm is part of a motor vehicle and has a lower end pivoted on the vehicle about an axis that is normally perpendicular to the arm and is provided at its outer end with a pivot pin that extends perpendicular to a plane including the arm's longitudinal axis and lower-end pivot axis. The blade assembly includes at least one elongated elastomeric blade received in a metallic backing strip in turn held in a plurality of secondary yokes that themselves are pivoted on a primary yoke that is traversed by the pivot pin on the wiper-arm outer end. The blade assembly itself normally extends generally parallel to the wiper arm but can pivot on the pivot pin to follow the curvature of the windshield being wiped.

Thus the pivot pin is a nonstandard item whose dimensions are established by the vehicle manufacturer, so that it can correspond to metric or English measurements and vary considerably in size and length. This poses a problem for a manufacturer of wiper-blade assemblies which must be made to fit a large rang of vehicles.

It has been suggested in British patent 2,168,243 to provide differently dimensioned openings in the main yoke for receiving differently dimensioned pivot pins. A latch releasably retains one or the other pivot pin in its associated opening. Such an arrangement can lead to off-center mounting of the wiper arm, causing undesired torque when it is used.

OBJECTS OF THE INVENTION

It is therefore an object of the present invention to provide an improved system for mounting a wiper-blade assembly on a wiper arm.

Another object is the provision of such a improved system for mounting a wiper-blade assembly on a wiper arm which overcomes the above-given disadvantages, that is which is simple and inexpensive and that allows virtually any assembly to be fitted to virtually any arm.

SUMMARY OF THE INVENTION

An adapter for mounting a blade assembly on a wiper arm comprises an adapter body formed with a transverse adapter-body hole through which the pin is engageable, a latch for releasably retaining the pin in the hole, and a mount securing the body on the assembly over the blade hole thereof. The body is of U-section and embraces the blade assembly at the blade hole. In addition the body has a pair of side walls that form the mount and that flank the blade assembly at the blade hole. These side walls are formed with aligned holes and the blade assembly has at the blade hole lateral projections engageable in aligned holes. The projections in turn are annular collars coaxial with the blade hole.

According to another feature of this invention another pin projects through the collars, side-wall holes, and blade hole. A further latch releasably retains the other pin in the blade hole. The blade assembly has planar and parallel flat top and bottom surfaces symmetrically flanking an axis of the blade hole. Thus the body can fit against either the top or bottom surface.

DESCRIPTION OF THE DRAWING

The above and other objects, features, and advantages will become more readily apparent from the following, reference being made to the accompanying drawing in which.

DESCRIPTION

Figure 1:
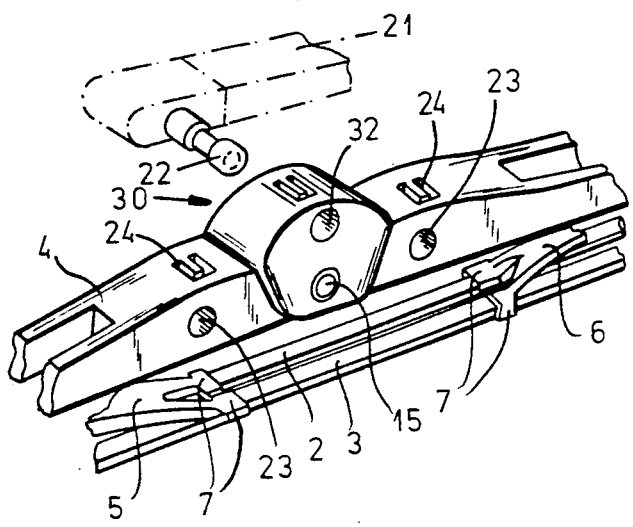
FIG. 1 is a perspective view of an adapter according to this invention and the associated structure of a wiper-blade assembly.
Figure 2:
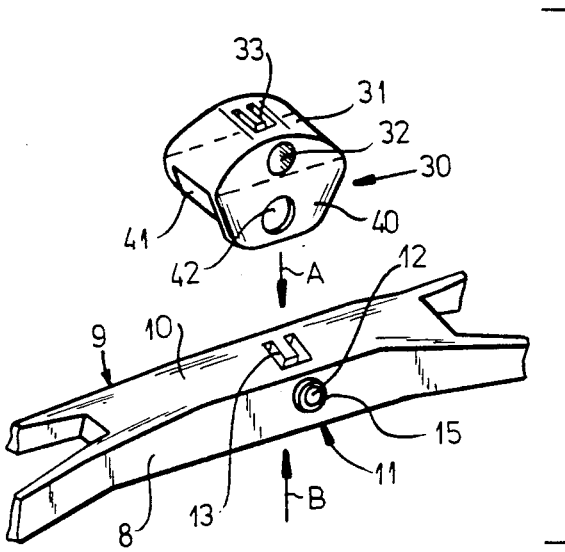
FIG. 2 is an exploded view of the adapter and main yoke of the wiper-blade assembly.

As seen in FIGS. 1 and 2 a central portion of a dual wiper blade assembly generally designated 1 comprises flexible blade-carrying backing strips 2 and 3 and a yoke assembly including a main yoke 4 and secondary yokes 5 and 6 (only two of which are partially shown in FIG. 1). The secondary yokes 5 and 6 have claws 7 which embrace and hold the backing strips 2 and 3.

As better seen in FIG. 2 the central portion of the yoke 4 has spaced and parallel side walls 8 and 9 and spaced and parallel flat top and bottom walls 10 and 11. A cylindrical throughgoing opening 12 extends between the side walls 8 and 9 and a resiliently deflectable finger 13 is formed in the top wall 10. The finger 13 forms a latch portion 14 which projects radially into the opening 12. The opposite ends of the opening 12 are defined by annular coaxial collars 15 and 16 which project oppositely from the respective side walls 8 and 9. The yoke 4 may be formed with further such holes 23 with further such latches 24 for securing other pivot pins.

Figure 3:
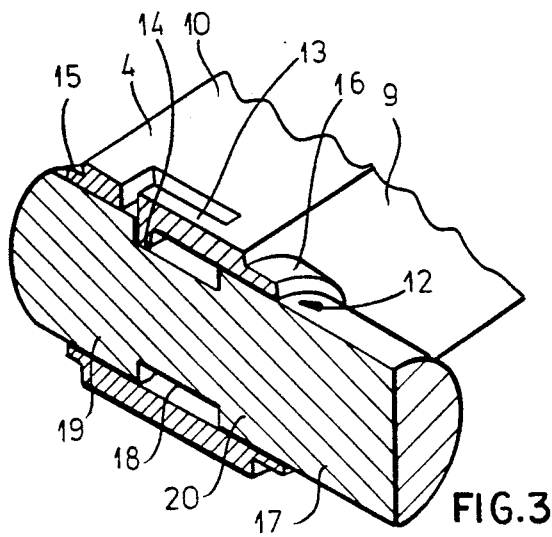
FIG. 3 is a large-scale axial section through the pivot pin and adapter according to this invention.
Figure 4:
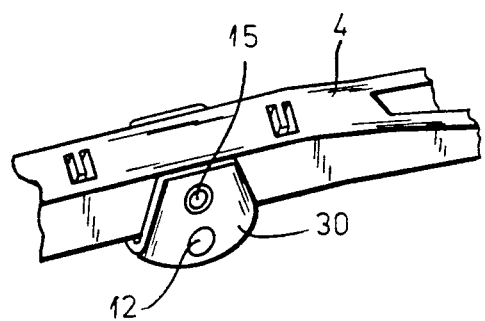
FIG. 4 is a detail view illustrating an alternative position for the adapter of this invention.

FIG. 3 shows a pivot pin 17 received in the opening 12. The pivot pin 17 has an annular recess or central small-diameter region 18 between circular cylindrical end portions 19 and 20 both of the same larger diameter. The latch portion 14 of the resilient finger 13 is received in the annular recess 18 to retain the pivot pin 17 axially within the opening 12 and the cylindrical wall of the opening 12 supports the circular cylindrical portions 19 and 20. The pivot pin 17 is able to turn about its axis within the opening 12 and can only be withdrawn axially when the finger 13 is intentionally flexed out so that the latch portion 14 is moved radially out of the annular recess 18.

As shown in FIGS. 1 and 2 an adapter 30 is detachably connectable to the main yoke 4 and serves to connect this main yoke 4 to a wiper arm 21 shown in dot-dash lines in FIG. 1 and having a pivot pin 22. The adapter 30 comprises a main adapter body 31 formed with a generally cylindrical throughgoing passage 32 and a resiliently deflectable finger 33 with an unillustrated latch portion projecting radially into the passage 32 like the latch 14 of the finger 13. In addition the adapter 30 has resiliently deflectable spaced apart side walls or cheeks 40 and 41 each formed with a throughgoing hole 42, the holes 42 being coaxial and parallel to the passage 32. In order to mount the adapter 30 on the main yoke 4, the side walls 40 are spread by elastic deformation of the adapter body 31 and the annular collars 15 and 16 are snap fitted into the holes 42 so that the adapter straddles the main yoke 4 as shown in FIG. 1 with its side walls 40 and 41 against the side walls 8 and 9 and its adapter body 31 against the top wall 10.

The passage 32 and finger 33 are similar to the opening 12 and finger 13, respectively. However, the two openings are designed to receive differently sized pivot pins. In particular opening 12 is designed to receive a standard pivot pin 17 of 0.1875 in (4.76 mm) diameter and passage 32 is designed to receive a standard pivot pin 22 of 0.25 in (6.35 mm) diameter. The axial length and depth of the annular recess 18 is different for the two different standard pivot pins and the position of the latch portion of the associated resilient finger 13 or 33 is designed accordingly.

The arrow A in FIG. 2 indicates the direction in which the adapter 30 is moved in order to mount the adapter with its adapter body 31 on top of the main yoke 4. However the adapter 30 and main yoke 4 are designed to enable the adapter also to be mountable from below so that the adapter body 31 lies beneath and closely adjacent the bottom wall 11 of the main yoke 4. To effect bottom mounting of the adapter, it is necessary to invert the adapter 30 from its orientation shown in FIG. 2 and move it upward in the direction of arrow B. The ability to mount the adapter 30 beneath the main yoke 4 so that the pin-receiving adapter body 31 is located between the main yoke 4 and the backing strips 2 and 3 is particularly important in situations where a low profile is required, e.g. on vehicles where the wiper is to be parked under the hood where the latter meets the windshield.

Whether the adapter 30 is mounted to straddle the main yoke 4 from above or below, it is preferably designed so that its adapter body 31 projects upward or downward, only a minimum amount from the top or bottom wall, respectively, of the main adapter body 31. Accordingly the adapter body 31 has a low profile, that is dimension in a plane including the axes of the passage 32 and holes 42, and has an inner surface designed to fit closely against the top or bottom walls 10 or 11 when the adapter is mounted from above or below, respectively. In this case the through hole 12 should therefore be positioned midway between the top and bottom walls 10 and 11 and which are preferably planar and parallel to each other.

The adapter 30 may be modified in several ways. For example, instead of being mounted to the main yoke 4 by the collars 15 and 16 snapped into the holes 42, it would be possible to provide inwardly directed lugs at the bottom as viewed in FIGS. 1 and 2 of each side wall 40 and 41 which snap behind the bottom wall 11 when the adapter 30 is mounted from above or behind the top wall 10 when the adapter 30 is mounted from below. Alternatively the adapter may be designed to be mounted on a pivot pin (not shown) permanently secured between the side walls of the main yoke. In this case the adapter body 31 could be formed with a groove that would snap fit around the pin 22 on the wiper arm 21.

I claim:

1. An adapter for mounting a blade assembly on an elongated wiper arm, the blade assembly having a transversely throughgoing blade hole and generally planar and parallel flat top and bottom surfaces symmetrically flanking an axis of the blade hole, the arm having a transversely projecting arm pivot pin, the adpater comprising:
    a U-section adapter body embracing the blade assembly at the blade hole and formed with a transverse adapter-body hole through which the pin is engageable and with a pair of side walls that flank the blade assembly at the blade hole, the body being shaped to fit in one position against the top surface and in another position against the bottom surface of the blade assembly, the side walls engaging over the blade hole in both positions;
    latch means for releasably retaining the pin in the adapter-body hole in both positions; and
    mounting means for securing the side walls of the adaptor body to the blade assembly in both positions of the adaptor body on the assembly.

2. The adapter defined in claim 1 wherein the mounting means is comprised of aligned mounting holes in the sidewall, the blade assembly having at the blade hole lateral projections engageable in said aligned mounting holes.

3. The adapter defined in claim 2 wherein the projections are annular collars coaxial with the blade hole.

4. The adapter defined in claim 1 wherein the blade assembly is formed with a plurality of such blade holes all extending parallel to each other and spaced apart along a portion of the blade assembly.

* * * * *